(12) United States Patent
Maeda et al.

(10) Patent No.: US 8,950,749 B2
(45) Date of Patent: Feb. 10, 2015

(54) IMAGE READING APPARATUS THAT READS ORIGINAL SHEET WHILE CONVEYING THE SAME

(71) Applicants: Takashi Maeda, Nagoya (JP); Muneaki Takahata, Toyoake (JP); Yoshinori Osakabe, Seto (JP); Masayoshi Oosaki, Nagoya (JP)

(72) Inventors: Takashi Maeda, Nagoya (JP); Muneaki Takahata, Toyoake (JP); Yoshinori Osakabe, Seto (JP); Masayoshi Oosaki, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 14/039,490

(22) Filed: Sep. 27, 2013

(65) Prior Publication Data

US 2014/0138898 A1    May 22, 2014

(30) Foreign Application Priority Data

Nov. 20, 2012  (JP) ................................. 2012-254696

(51) Int. Cl.
*B65H 5/34* (2006.01)
*B65H 7/20* (2006.01)
*B65H 3/06* (2006.01)

(52) U.S. Cl.
CPC ... *B65H 7/20* (2013.01); *B65H 3/06* (2013.01)
USPC ........................................................ 271/270

(58) Field of Classification Search
USPC ............................ 271/270; 358/498; 399/370
See application file for complete search history.

(56) References Cited

U.S. PATENT DOCUMENTS

| 4,713,674 | A | * | 12/1987 | Giezeman et al. ............. 399/390 |
| 4,714,941 | A | * | 12/1987 | Yamagishi et al. ............. 399/86 |
| 5,915,158 | A | * | 6/1999 | Minagawa et al. ........... 399/370 |
| 6,851,802 | B2 | | 2/2005 | Sakakibara et al. |
| 7,384,042 | B2 | | 6/2008 | Sakakibara et al. |
| 8,121,510 | B2 | * | 2/2012 | Roppongi ........................ 399/82 |
| 8,693,072 | B2 | * | 4/2014 | Osakabe et al. .............. 358/498 |
| 2009/0027740 | A1 | * | 1/2009 | Kang ............................. 358/488 |
| 2014/0138897 | A1 | * | 5/2014 | Oosaki et al. ................. 271/3.16 |

FOREIGN PATENT DOCUMENTS

| JP | H11-127301 A | 5/1999 |
| JP | H11-227976 A | 8/1999 |
| JP | 2012-182662 A | 9/2012 |

* cited by examiner

*Primary Examiner* — Jeremy R Severson
(74) *Attorney, Agent, or Firm* — Scully, Scott, Murphy & Presser, P.C.

(57) ABSTRACT

In an image reading apparatus, it is judged whether an original sheet is either one of a first sheet type, whose sheet length is longer than or equal to a first conveyance distance and shorter than a second conveyance distance, and a second sheet type, whose sheet length is longer than or equal to the second conveyance path, the first conveyance distance being distance between a first conveyance roller and a second conveyance roller, the second conveyance distance being distance between a supply roller and the second conveyance roller. The original sheet is conveyed at a separation timing, when the original sheet separates away from the supply roller, at a speed that is smaller for a case where the original sheet is of the first sheet type than for a case where the original sheet is of the second sheet type. An image is read from the conveyed original sheet.

7 Claims, 11 Drawing Sheets

IMAGE READING APPARATUS THAT READS ORIGINAL SHEET WHILE CONVEYING THE SAME

CROSS REFERENCE TO RELATED APPLICATION

This application claims priority from Japanese Patent Application No. 2012-254696 filed Nov. 20, 2012. The entire content of this priority application is incorporated herein by reference.

TECHNICAL FIELD

The present invention relates to an image reading apparatus for reading an image from an original sheet while conveying the original sheet.

BACKGROUND

There is conventionally known an image reading apparatus of a type that reads an image from an original sheet while conveying the original sheet, such as a Japanese Patent Application Publication No. 11-127301.

SUMMARY

It is conceivable that an image reading apparatus has a supply roller, first conveyance rollers, and second conveyance rollers in this order along a conveyance path in a conveying direction from its upstream side to its downstream. The supply roller sends out an original sheet placed on a sheet feed tray one sheet by one sheet to the conveyance path. This image reading apparatus can convey the original sheet by using the rollers if the length of the original sheet in the sheet conveying direction is longer than both of the distance along the conveyance path between the supply roller and the first conveyance rollers and the distance along the conveyance path between the first and second conveyance rollers.

In this conceivable image reading apparatus, while being conveyed along the conveyance path, the original sheet receives driving force from the first and second conveyance rollers and also receives a restraining force from the supply roller. This suppresses generation of wrinkles in the original sheet. When the original sheet separates away from the supply roller, the original sheet is released from the restraining force from the supply roller. So, the conveyance speed of the original sheet will possibly rise instantaneously.

In this case, if the length of the original sheet is shorter than the conveyance distance between the supply roller and the second conveyance rollers along the conveyance path, the original sheet (which will be referred to as "short sheet" hereinafter) is in contact with only the first conveyance rollers when the short sheet separates away from the supply roller. On the other hand, if the length of the original sheet is longer than or equal to the conveyance distance between the supply roller and the second conveyance rollers along the conveyance path, the original sheet (which will be referred to as "long sheet" hereinafter) is in contact with both of the first and second conveyance rollers when the long sheet separates away from the supply roller. So, compared to a long sheet, the conveyance speed for a short sheet is likely to instantaneously rise when the original sheet separates away from the supply roller. As a result, part of the short sheet may possibly not be read. In this way, according to the conceivable image reading apparatus, some part of an image will possibly become unable to be read from the original sheet dependently on the size of the original sheet.

An object of the present invention is therefore to provide an image reading apparatus that reads an image from an original sheet while conveying the original sheet and that can restrain occurrence of those image regions that are unable to be read from the original sheet.

In order to attain the above and other objects, the invention provides an image reading apparatus, including: a sheet feed tray; a supply roller; the conveyance unit; a discharged-sheet receiving unit; an image reading unit; and a control device. The supply roller is configured to rotate while being in contact with an original sheet placed on the sheet feed tray and to send out the original sheet one sheet by one sheet to a conveyance path. The conveyance unit includes a first conveyance roller and a second conveyance roller and configured to convey, along the conveyance path, the original sheet that has been sent out by the supply roller to the conveyance path, the conveyance unit conveying the original sheet by using the first conveyance roller and the second conveyance roller in succession in this order. The original sheet that has been conveyed by the conveyance unit is discharged into a discharged-sheet receiving unit. The image reading unit is disposed at a reading position along the conveyance path between the first conveyance roller and the second conveyance roller and configured to read an image, in a main scanning direction, from the original sheet conveyed by the conveyance unit at the reading position. The control device is configured to: judge whether the original sheet is either one of a first sheet type, whose sheet length in a conveying direction along the conveyance path is longer than or equal to a first conveyance distance and shorter than a second conveyance distance, and a second sheet type, whose sheet length in the conveying direction along the conveyance path is longer than or equal to the second conveyance path, the first conveyance distance being a distance between the first conveyance roller and the second conveyance roller along the conveyance path, the second conveyance distance being a distance between the supply roller and the second conveyance roller along the conveyance path; control the conveyance unit to convey the original sheet such that the original sheet is conveyed at a separation timing, when the original sheet separates away from the supply roller, at a conveyance speed that is smaller for a case where the original sheet is of the first sheet type than for a case where the original sheet is of the second sheet type; and read, by using the image reading unit, an image from the original sheet that is conveyed by the conveyance unit through the control.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
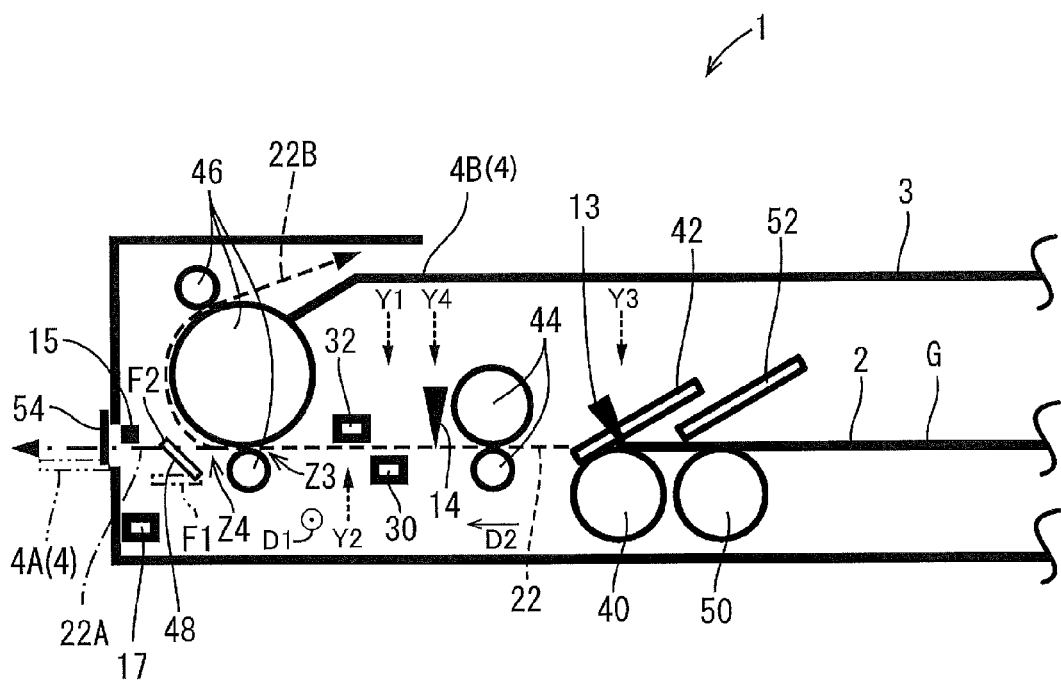
FIG. 1 is a schematically cross-sectional view of an image reading apparatus according to a first embodiment of the present invention.

An image reading apparatus according to embodiments of the invention will be described while referring to the accompanying drawings wherein like parts and components are designated by the same reference numerals to avoid duplicating description.

First Embodiment

A first embodiment will be described with reference to FIGS. 1 to 8.

1. Mechanical Configuration of Image Reading Apparatus

As shown in FIG. 1, an image reading apparatus 1 is a sheet-feed scanner that conveys, one sheet by one sheet, a plurality of original sheets G placed by a user on a sheet feed tray 2 to a sheet discharge portion 4, and reads a conveyed original sheet G by using a first CIS 30 and a second CIS 32 contained in a main body 3 of the image reading apparatus 1.

In the main body 3 of the image reading apparatus 1, a conveyance path 22 is provided to connect the sheet feed tray 2 to the sheet discharge portion 4. Around the conveyance path 22, the following components are provided: a sheet feed roller 40, a separation pad 42, first conveyance rollers 44, second conveyance rollers 46, a switching plate 48, the first CIS 30, the second CIS 32, a front sensor (referred to as F sensor, hereinafter) 13, and a rear sensor (referred to as R sensor, hereinafter) 14.

The sheet feed roller 40 rotates, while being in contact with the original sheets G placed on the sheet feed tray 2, thereby sending out the original sheets G into the main body 3. More specifically, the original sheets G are separated from one another due to a friction force of the separation pad 42, and are sent out sheet one by one to the conveyance path 22.

The sheet feed tray 2 is provided with a pickup roller 50 and a pickup pad 52, which confront each other across the original sheet G placed on the sheet feed tray 2. The pickup roller 50 and the pickup pad 52 assist the sheet feed roller 40 and the separation pad 42 in sending the original sheet G placed on the sheet feed tray 2 to the conveyance path 22.

The conveyance rollers 44 and 46 are driven by a motor M (Refer to FIG. 3) to convey, along the conveyance path 22, the original sheet G that has been drawn into the main body 3. Along the conveyance path 22, the first conveyance rollers 44 are disposed on the upstream side relative to the second conveyance rollers 46 in a conveyance direction D2, in which the original sheet G is conveyed. The conveyance direction D2 is also referred to as a "sub-scanning direction D2." A first conveyance distance L1 is defined as a distance between the first conveyance rollers 44 and the second conveyance rollers 46 along the conveyance path 22. A second conveyance distance L2 is defined as a distance between the sheet feed roller 40 and the second conveyance rollers 46 along the conveyance path 22. Original sheets G that can be conveyed by the image reading apparatus 1 of the present embodiment have sheet lengths, along the conveyance path 22, that are longer than the first conveyance distance L1.

The first CIS 30 is disposed at a first reading position Y1 that is between the first conveyance rollers 44 and the second conveyance rollers 46 on the conveyance path 22. The first CIS 30 is for reading the front surface of a conveyed original sheet G at the first reading position Y1. The second CIS 32 is disposed at a second reading position Y2 that is between the first reading position Y1 and the second conveyance rollers 46 on the conveyance path 22. The second CIS 32 is for reading a back surface of a conveyed original sheet G at the second reading position Y2.

A third conveyance distance L3 (See FIG. 2) is defined as a distance between the sheet feed roller 40 and the first reading position Y1 along the conveyance path 22. It is noted that sheet lengths, along the conveyance path 22, of the original sheets G that can be conveyed by the image reading apparatus 1 of the present embodiment are also longer than the third conveyance distance L3. Therefore, the first CIS 30 can read a conveyance-direction leading edge of the original sheet G, while the original sheet G is being conveyed by the sheet feed roller 40. Hereinafter, a distance that is calculated by subtracting the third conveyance distance L3 from the sheet length of the original sheet G is referred to as a conveyance reference distance LK of the original sheet G.

The second conveyance rollers 46 are for discharging the original sheet G onto the sheet discharge portion 4. The sheet discharge portion 4 includes a sheet discharge tray 4A and a sheet discharge tray 4B.

The switching plate 48 is disposed on the opposite side of the second conveyance rollers 46 with respect to the conveyance path 22. The switching plate 48 switches between a first posture F1, at which the switching plate 48 extends along a straight path (referred to as S path, hereinafter) 22A to the sheet discharge tray 4A, and a second posture F2, at which the switching plate 48 extends along a U-turn path (referred to as U path, hereinafter) 22B to the sheet discharge tray 4B.

The S path 22A and the U path 22B diverge from the conveyance path 22 at a position Z4 that is on the downstream side of a position Z3. At the position Z3, the conveyance path 22 reaches the second conveyance rollers 46 from the upstream side of the second conveyance rollers 46 in the conveyance direction D2. At the position Z4, the conveyance path 22 confronts the switching plate 48. The S path 22 extends substantially linearly, and is used for conveying small sheets such as business cards and postcards. Part of the U path 22B is bent or curved along the periphery of one of the second conveyance rollers 46, and is used for conveying large sheets such as A4-size sheets.

The sheet discharge tray 4A is configured from a discharge tray plate 54 that is part of an outer case of the main body 3. The sheet discharge tray 4B is formed by an upper portion of the outer case of the main body 3.

The discharge tray plate 54 is pivotable to the main body 3. The discharge tray plate 54 pivots from a closed state indicated by a solid line in FIG. 1 to an opened state indicated by a two-dot chain line in FIG. 1. In the opened state, the discharge tray plate 54 serves as the sheet discharge tray 4A. The switching plate 48 switches between the first and second postures F1 and F2 in interlocking relationship with the discharge tray plate 54. That is, when the discharge tray plate 54 becomes the opened state, the switching plate 48 switches to the first posture F1. When the discharge tray plate 54 becomes the closed state, the switching plate 48 switches to the second posture F2. In the main body 3, a tray plate detection sensor 15 is provided to detect the opened and closed states of the discharge tray plate 54. The tray plate detection sensor 15 is being ON when the discharge tray plate 54 is in the closed state, and is being OFF when the discharge tray plate 54 is in the opened state.

When the switching plate 48 takes the first posture F1 indicated by a two-dot chain line in FIG. 1, the original sheet G is conveyed along the S path 22A, and is discharged onto the sheet discharge tray 4A. On the other hand, when the switching plate 48 takes the second posture F2 indicated by a solid line in FIG. 1, the original sheet G is conveyed along the U path 22B, and is discharged onto the sheet discharge tray 4B. In this way, the pickup roller 50, the sheet feed roller 40, the first conveyance rollers 44, and the second conveyance rollers 46 constitute a conveyance unit 56 for conveying, along the conveyance path 22, the original sheet G that has been placed on the sheet feed tray 2.

The front sensor 13 is disposed at a detection position Y3 in the sheet feed tray 2. The front sensor 13 is being ON when an original sheet G is placed on the sheet feed tray 2, and is being OFF when no original sheet G is placed on the sheet feed tray 2. The rear sensor 14 is disposed at a detection position Y4 between the first conveyance rollers 44 and the first reading position Y1 along the conveyance path 22. The rear sensor 14 is being ON when an original sheet G is passing through the detection position Y4 on the conveyance path 22, and is being OFF when no original sheet G is passing through the detection position Y4. Thus, the rear sensor 14 detects a original sheet G passing through the detection position Y4.

Figure 2:
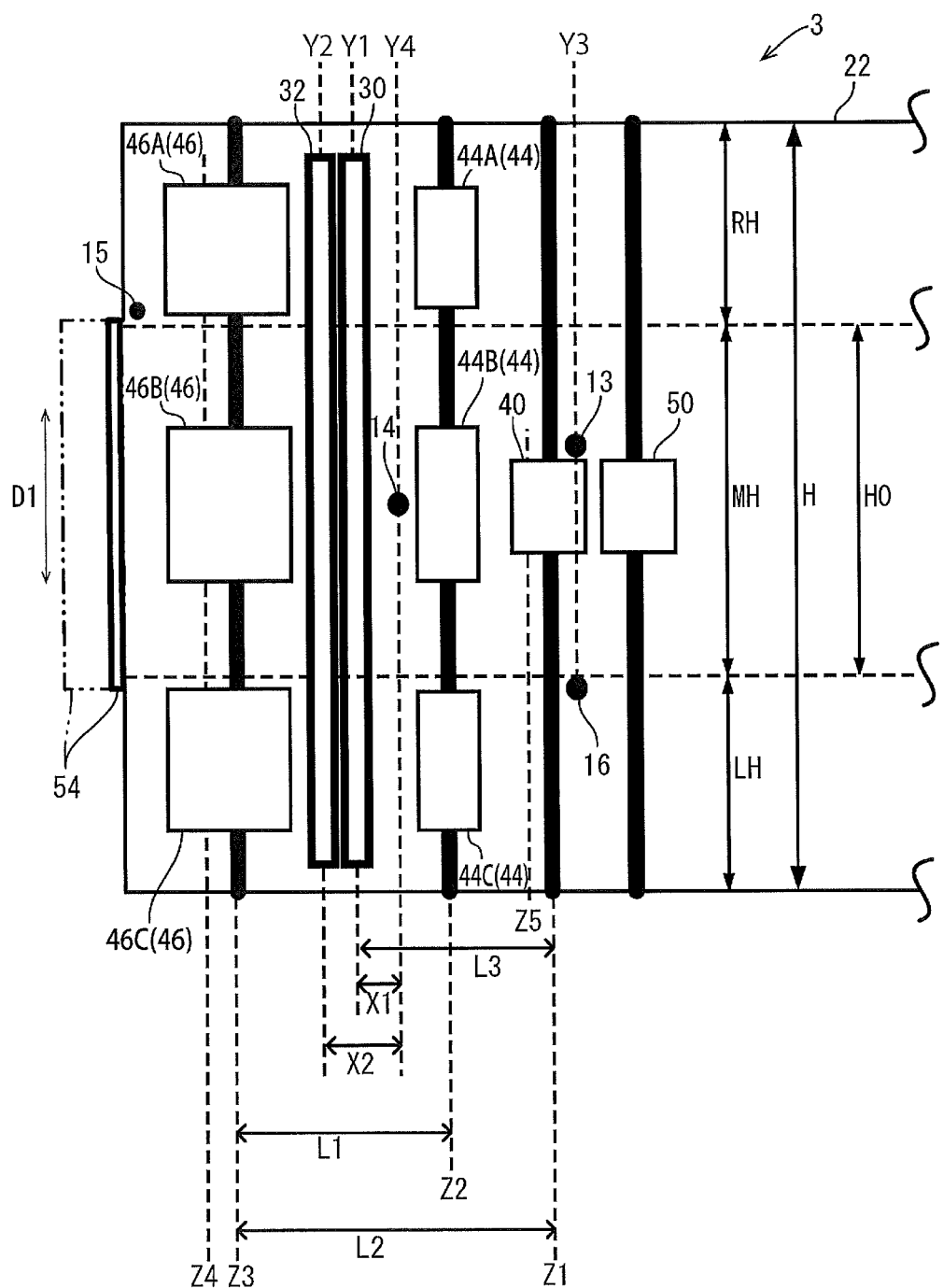
FIG. 2 is a schematically top view of the inside of a main body of the image reading apparatus shown in FIG. 1.

Furthermore, in the image reading apparatus 1, a sheet size detection sensor 16, a temperature sensor 17, an operation unit 11, and a display unit 12 are provided. The sheet size detection sensor 16 is disposed at the detection position Y3 in the conveyance direction D2 similarly to the front sensor 13 as shown in FIG. 2. The sheet size detection sensor 16 is being ON when an original sheet G placed on the sheet feed tray 2 is a large sheet, and is being OFF when the original sheet G is a small sheet. The temperature sensor 17 is for detecting a temperature T inside the apparatus 1. The operation unit 11 (See FIG. 3) includes a power switch and various setting buttons, and receives operation instructions and reading settings inputted by a user. The display unit 12 (See FIG. 3) includes an LED or liquid crystal display, and is for displaying the state of the image reading apparatus 1.

FIG. 2 is a top view of the inside of the main body 3. The conveyance path 22 has a predetermined width in a main scanning direction D1 which is substantially orthogonal to the conveyance direction (sub-scanning direction) D2. The entire region of the conveyance path 22 in the main scanning direction D1 is referred to as a "conveyance region H." When an original sheet G is placed on the sheet feed tray 2 that is in connection with the conveyance path 22, the original sheet G is positioned with its center in the main scanning direction D1 being aligned with the center of the conveyance path 22 in the main scanning direction D1. When conveying a large sheet G on the conveyance path 22, the entire part of the conveyance region H of the conveyance path 22 in the main scanning direction D1 is used to convey the large sheet G. When conveying a small sheet G, only a center region MH of the conveyance region H is used to convey the small sheet G. The center region MH is part of the conveyance region H that is located in the center of the conveyance region H in the main scanning direction D1, and has a width H0 in the main scanning direction D1. Hereinafter, in the conveyance region H, a region on the right side of the center region MH is referred to as a right region RH, and a region on the left side of the center region MH as a left region LH, as viewed from the upstream side in the conveyance direction D2.

The width of the discharge tray plate 54 in the main scanning direction D1 is substantially equal to the width of the center region MH. Accordingly, onto the sheet discharge tray 4A formed by the discharge tray plate 54, a small sheet that is conveyed only by the center region MH is discharged. The front sensor 13 and the rear sensor 14 are disposed near the center of the center region MH in the main scanning direction D1 at the detection position Y3 and Y4, respectively. At the detection position Y3, the sheet size detection sensor 16 is disposed in the left region LH at a position near to the boundary between the left region LH and the center region MH.

The pickup roller 50 and the sheet feed roller 40 are each made up from one roller that is disposed in the center region MH in the main scanning direction D1. Each of the first conveyance rollers 44 includes three roller portions 44A, 44B, and 44C that are arranged to rotate around the same rotation axis extending in the main scanning direction D1 and in synchronization with each other. The three roller portions 44A, 44B, and 44C constituting each of the first conveyance rollers 44 are disposed in the right region RH, the center region MH, and the left region LH, respectively. Similarly, each of the second conveyance rollers 46 includes three roller portions 46A, 46B, and 46C that are arranged to rotate around the same rotation axis extending in the main scanning direction D1 and in synchronization with each other. The three roller portions 46A, 46B, and 46C constituting each of the second conveyance rollers 46 are disposed in the right region RH, the center region MH, and the left region LH, respectively.

Figure 6:
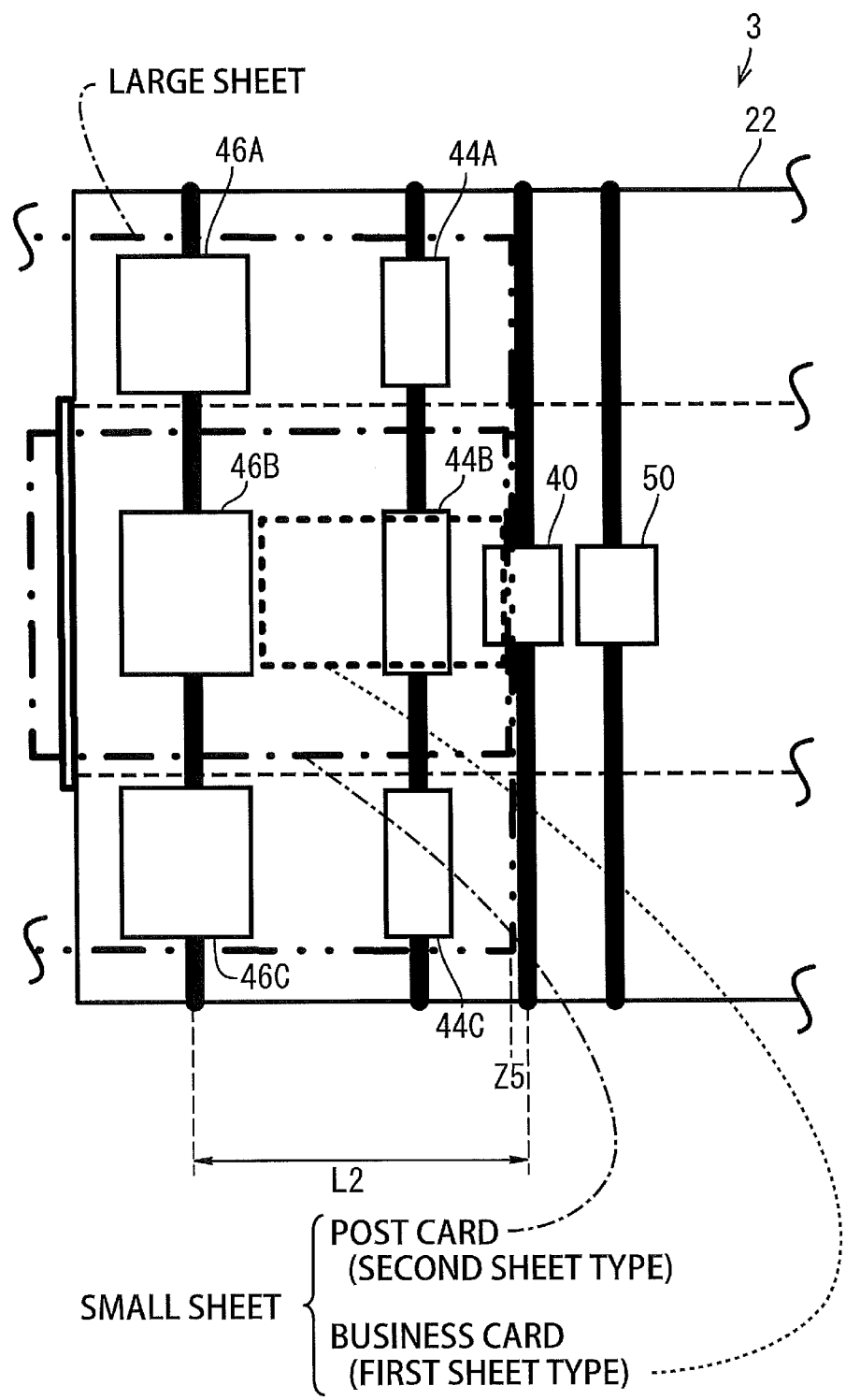
FIG. 6 illustrates position of each type of original sheet when the original sheet separates away from a sheet feed roller.

When a small sheet such as a business card indicated by a dashed line in FIG. 6 or a postcard indicated by a one-dot chain line is conveyed by the first conveyance rollers 44 and the second conveyance rollers 46, the small sheet is conveyed by one of the three roller portions (roller portion 44B, 46B) in each of the first and second conveyance rollers 44 and 46 that are disposed in the center region MH. On the other hand, a large sheet such as an A4-size sheet indicated by a two-dot chain line in FIG. 6 is conveyed by more than one roller portion in each of the first and second conveyance rollers 44 and 46. More specifically, a large sheet such as an A4-size sheet is conveyed by all of the three roller portions 44A-44C and 46A-46C that constitute each of the first and second conveyance rollers 44 and 46.

2. Electrical Configuration of Image Reading Apparatus

Figure 3:
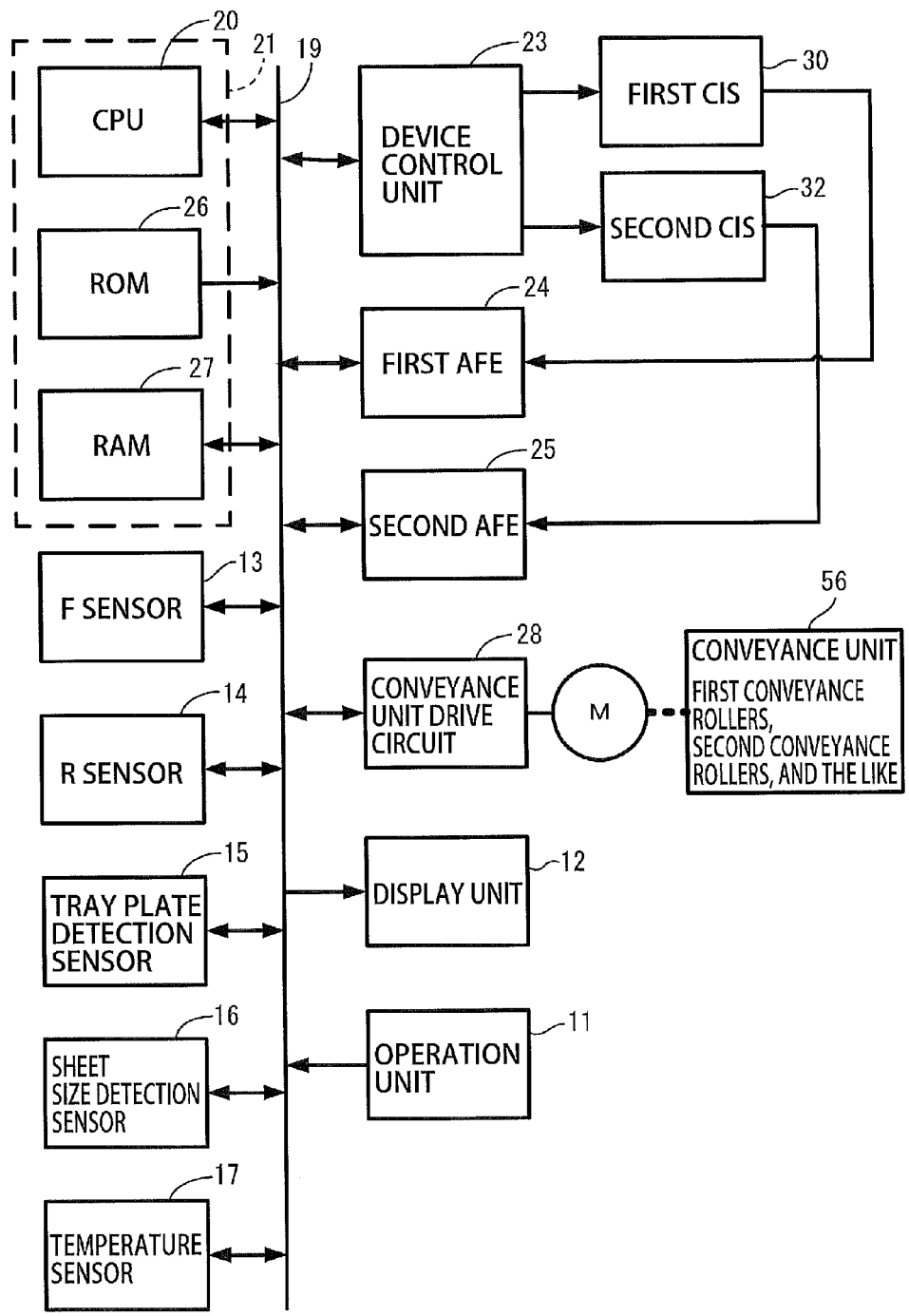
FIG. 3 is a block diagram schematically showing the electrical configuration of the image reading apparatus.

As shown in FIG. 3, the image reading apparatus 1 includes a central processing unit (referred to as CPU, hereinafter) 20, a ROM 26, a RAM 27, a device control unit 23, a first analog front end (referred to as AFE, hereinafter) 24, a second AFE 25, and a conveyance unit drive circuit 28. To the above components, the operation unit 11, the display unit 12, and the sensors 13 to 17 are connected via a bus 19. As indicated by a dotted line 21 in FIG. 3, the CPU 20, the ROM 26, and the RAM 27 constitute a control device for controlling the entire part of the image reading apparatus 1.

The ROM 26 is prestored with various programs for controlling an operation of the image reading apparatus 1. By executing the programs read from the ROM 26, the CPU 20 controls each part in the image reading apparatus 1 and also performs a conveyance reading process according to the present embodiment as described later. The ROM 26 is further prestored with: the first conveyance distance L1 and second conveyance distance L2; the width H0 of the center region MH; and the conveyance reference distance LK for each of all the sheet sizes that are conveyable by the image reading apparatus 1.

The device control unit 23 is connected to the CISs 30 and 32. Based on instructions outputted from the CPU 20, the device control unit 23 transmits reading control signals to the CISs 30 and 32. Each of the CISs 30 and 32 reads a corresponding surface of an original sheet G based on the reading control signal inputted from the device control unit 23.

The first AFE 24 is connected to the first CIS 30. The first AFE 24 converts analog read data outputted from the first CIS 30 into digital read data, i.e., digital gradation data. The first AFE 24 stores the converted gradation data in the RAM 27 via the bus 19. The second AFE 25 is connected to the second CIS 32. The second AFE 25 converts analog read data outputted from the second CIS 32 into digital read data, and stores the digital read data in the RAM 27 via the bus 19.

The conveyance unit drive circuit 28 is connected to the motor M. Based on a pulse signal inputted from the CPU 20, the conveyance unit drive circuit 28 drives the motor M to rotate. Upon receiving one pulse in the pulse signal, the motor M is driven to rotate by a predetermined one step's worth of rotation angle. As the motor M is driven by one step, the rollers constituting the conveyance unit 56 are rotated by predetermined angles, thereby conveying an original sheet G by a predetermined one step's worth of distance on the conveyance path 22.

To convey the original sheet G, the CPU 20 transmits a pulse signal to the conveyance unit drive circuit 28, whereupon the conveyance unit 56 conveys the original sheet G by a distance that is equivalent to a value determined by multiplying the number of pulses in the pulse signal and the predetermined one step's worth of distance. Hereinafter, the number of pulses in the pulse signal transmitted from the CPU 20 to the motor M is referred to as a step number.

Figure 10A:
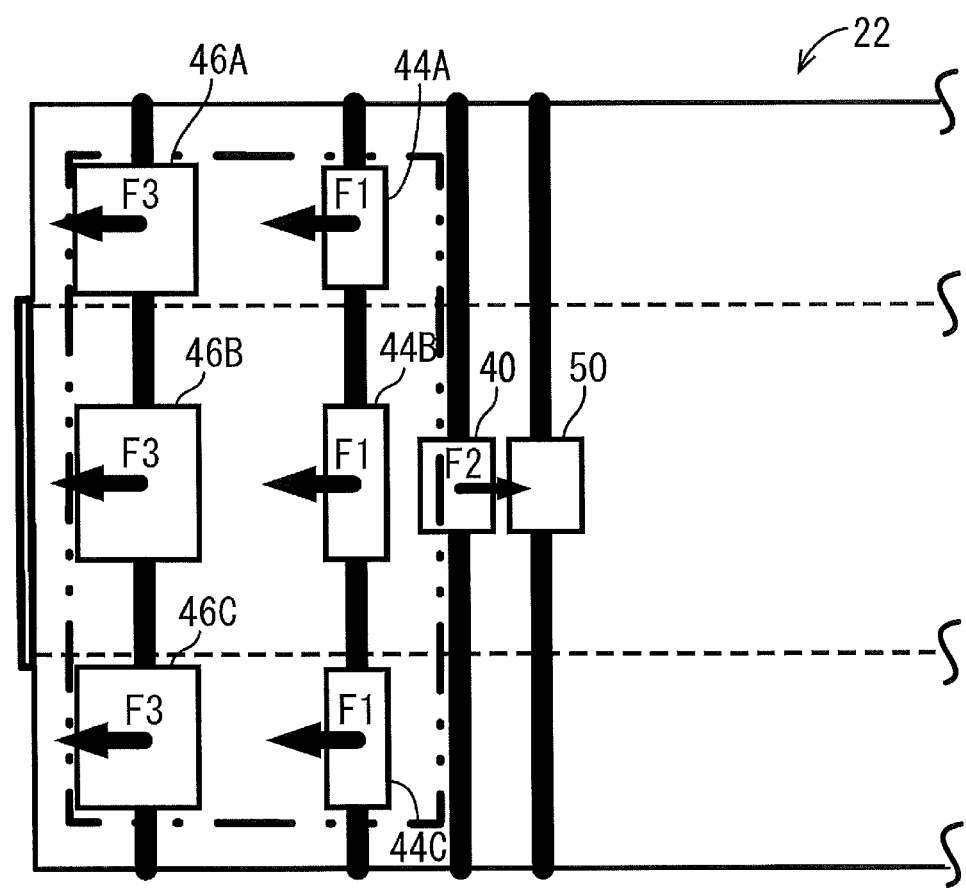
FIGS. 10A and 10B show various forces applied from conveyance unit to original sheets when the original sheets separate away from the sheet feed roller.
Figure 10B:
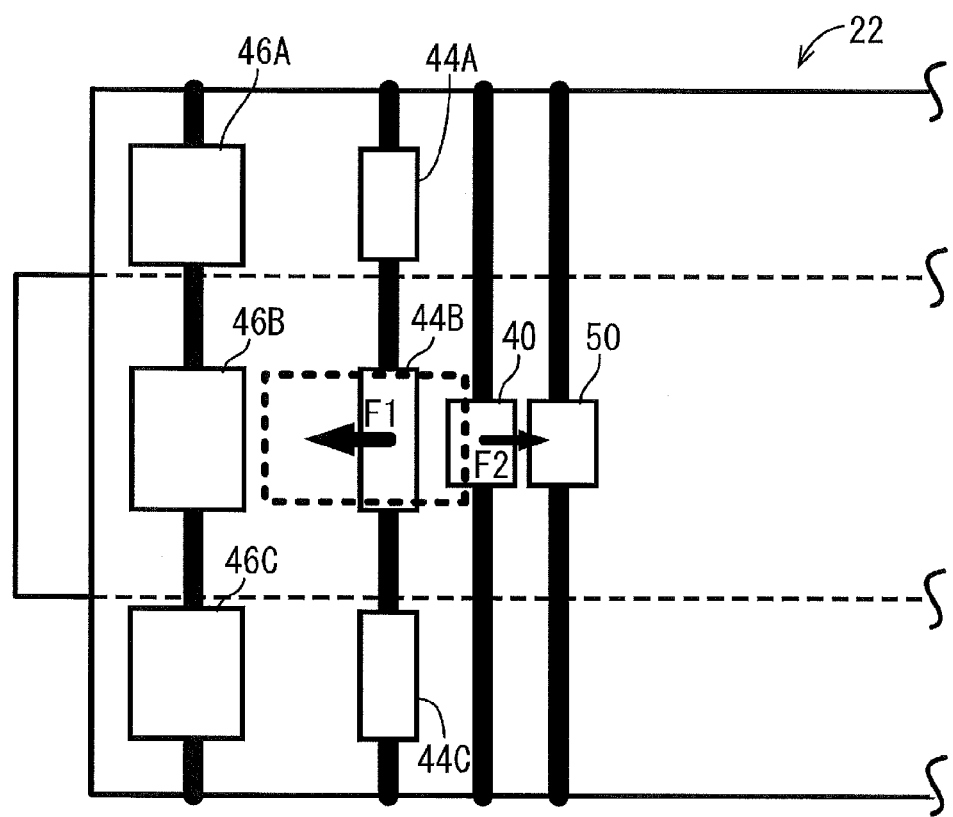

In the conveyance unit 56, in order to prevent an original sheet G conveyed along the conveyance path 22 from being wrinkled, when an original sheet G, which has been sent out by the sheet feed roller 40 to the conveyance path 22, starts being conveyed by the first and second conveyance rollers 44, 46, as shown in FIGS. 10A and 10B, the first conveyance rollers 44 apply the original sheet G with a driving force F1 for moving the original sheet G in the conveyance direction D2, the second conveyance rollers 46 apply the original sheet G with a driving force F3 for moving the original sheet G in the conveyance direction D2, and the sheet feed roller 40 applies the original sheet G with a restraining force F2 for restraining the original sheet G from moving in the conveyance direction D2.

As shown in FIG. 10A, a large sheet such as an A4-size sheet is conveyed by the three roller portions 44A-44C constituting each of the first conveyance rollers 44. Therefore, the large sheet G is subjected to at least three driving forces F1 and one restraining force F2 when the large sheet G is conveyed. Contrarily, as shown in FIG. 10B, a small sheet such as a business card is conveyed by the one roller portion 44B in each of the first conveyance rollers 44. Therefore, the small sheet G is subjected to one driving force F1 and one restraining force F2 when the small sheet G is conveyed. That is, the number of the roller portions in each of the first and second conveyance rollers 44, 46 that are used for conveying the small sheet G is fewer than that of the roller portions used for conveying the large sheet G. Therefore, in the total of the driving and restraining forces, the restraining force F2 has a greater impact on a small sheet than on a large sheet.

Therefore, at a separation timing when the original sheet G is separated from the sheet feed roller 40, disappearance of the restraining force F2 of the sheet feed roller 40 has a greater impact on a small sheet such as a business card indicated by a dashed line in FIG. 6 or a postcard indicated by a one-dot chain line in FIG. 6, in comparison with on a large sheet such as an A4-size sheet indicated by a two-dot chain line in FIG. 6. As a result, at the separation timing, the conveyance speed of the small sheet G is more likely to increase instantaneously than that of the large sheet.

Among the small sheets, a sheet G of a first sheet type, whose sheet length is shorter than the second conveyance distance L2, such as a business card indicated by a dashed line in FIG. 6 separates away from the sheet feed roller 40 before the original sheet G reaches the position Z3. Contrarily, among the small sheets, a sheet G of a second sheet type, whose sheet length is greater than or equal to the second conveyance distance L2, such as a postcard indicated by a one-dot chain line in FIG. 6 separates away from the sheet feed roller 40 after the sheet G reaches the position Z3.

That is, at the separation timing, the second sheet-type original sheet G is conveyed by both of the first conveyance rollers 44 and the second conveyance rollers 46. Contrarily, at the separation timing, the first sheet-type original sheet G is conveyed only by the first conveyance rollers 44.

As shown in FIG. 10A, at the separation timing, an original sheet G of the second sheet type whose sheet length is longer than or equal to the second conveyance distance L2 receives a driving force F1 from the first conveyance rollers 44, and a driving force F3 from the second conveyance rollers 46. As shown in FIG. 10B, at the separation timing, an original sheet G of the first sheet type whose sheet length is less than the second conveyance distance L2 does not receive the driving force F3 from the second conveyance rollers 46. Accordingly, at the separation timing, the first sheet-type original sheet G is subjected to a smaller driving force than the second sheet-type original sheet G is. So, disappearance of the restraining force F2 at the separation timing has a greater impact on the first sheet-type original sheet G in comparison with on the second sheet-type original sheet G.

Therefore, at the separation timing, the conveyance speed of the first sheet-type original sheet G is more likely to increase instantaneously than that of the second sheet-type original sheet G. As a result, those regions of the original sheet G that are positioned at the reading positions Y1 and Y2 at the separation timing may possibly not be read by the CISs 30 and 32.

Thus, some regions of the original sheet G may possibly not be read depending on whether the sheet length of the original sheet G is shorter than the second conveyance distance L2. So, according to the present embodiment, the conveyance reading process described below includes a process of decreasing the conveyance speed of the original sheet G at the separation timing dependently on the sheet length of the original sheet G to be read.

3. Conveyance Reading Process

Figure 4:
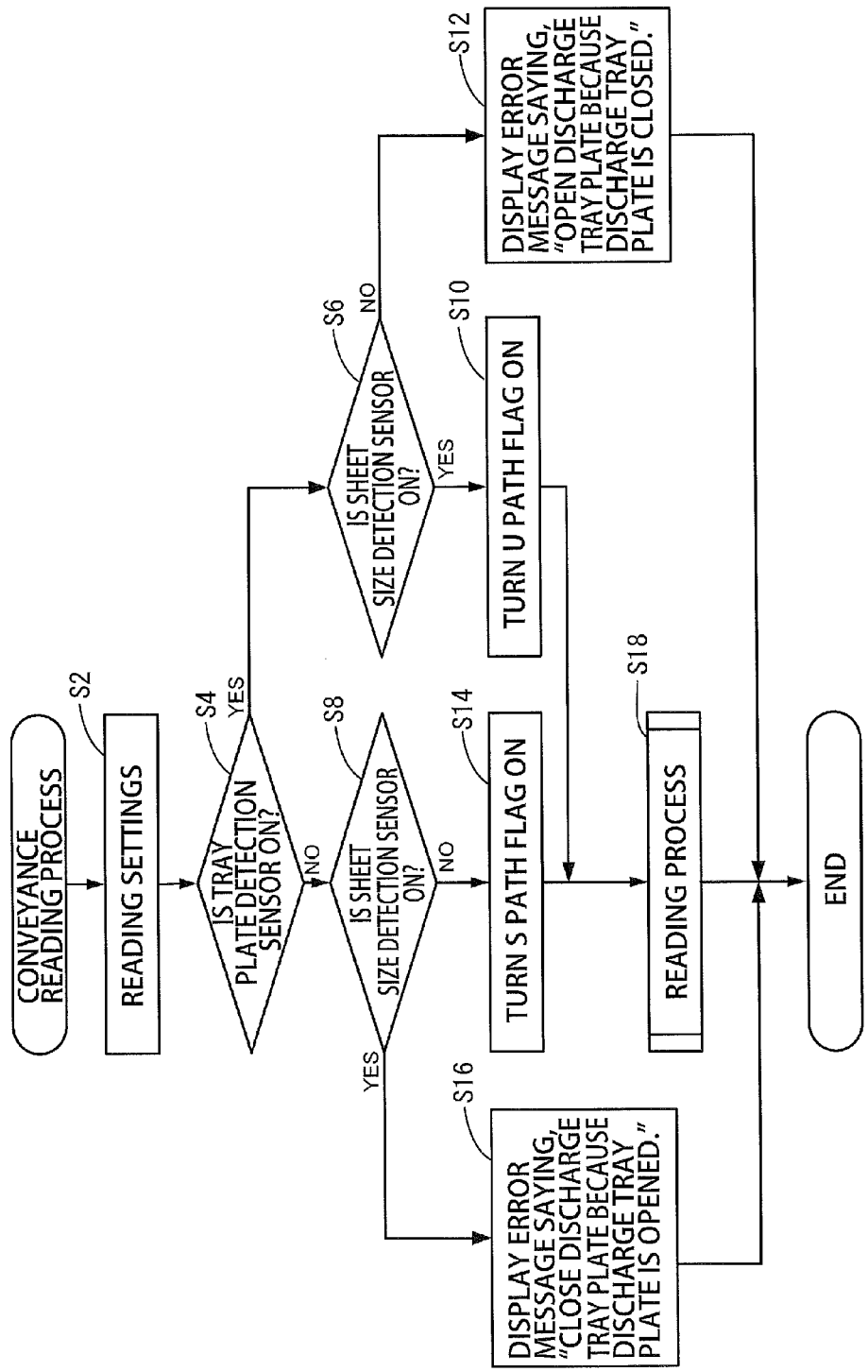
FIG. 4 is a flowchart of a conveyance reading process according to the first embodiment.

The following describes the conveyance reading process for an original sheet G with reference to FIGS. 4 to 7. According to the present embodiment, a front surface of an original sheet G is read by the first CIS 30. FIG. 4 is a flowchart showing the conveyance reading process that the CPU 20 performs in accordance with a prescribed program. The CPU 20 starts the process after the CPU 20 confirms by using the front sensor 13 that an original sheet G has been placed on the sheet feed tray 2 and a conveyance reading instruction for the original sheet G is inputted by a user through the operation unit 11.

After starting the conveyance reading process, the CPU 20 receives reading settings, such as a type of the original sheet G and a surface of the original sheet G to be read, which have been inputted by the user together with the conveyance reading instruction (S2). Then, the CPU 20 checks the state of the tray plate detection sensor 15 and sheet size detection sensor 16. More specifically, the CPU 20 first checks whether the tray plate detection sensor 15 is being ON. If the tray plate detection sensor 15 is being ON (S4: YES), i.e. if the discharge tray plate 54 is in the closed state, the CPU 20 detects that the original sheet G is to be conveyed along the U path 22B.

Then, the CPU 20 checks whether the sheet size detection sensor 16 is being ON (S6). If the sheet size detection sensor 16 is being ON (S6: YES), the state of the tray plate detection sensor 15 is consistent with the state of the sheet size detection sensor 16 because it is known that the original sheet G to be conveyed along the U path 22B is a large sheet. In this case, the CPU 20 turns ON a U path flag, indicating that the original sheet G is to be conveyed along the U path 22B (S10). Then, the CPU 20 performs a reading process described later (S18).

On the other hand, if the sheet size detection sensor 16 is being OFF (S6: NO), the CPU 20 detects that the original sheet G to be conveyed along the U path 22B is a small sheet. If a small sheet is conveyed along the U path 22B, the sheet is apt to be jammed in a curved portion along the periphery of one of the second conveyance rollers 46 on the U path 22B. So, the CPU 20 controls the display unit 12 to display an error message saying, "Open the discharge tray plate because the discharge tray plate is closed," before starting to convey the original sheet G (S12). Then, the CPU 20 ends the conveyance reading process.

If the tray plate detection sensor 15 is OFF (S4: NO), i.e. if the discharge tray plate 54 is in the opened state, the CPU 20 detects that the original sheet G is to be conveyed along the S path 22A. Then, the CPU 20 checks whether the sheet size detection sensor 16 is being ON (S8). If the sheet size detection sensor 16 is being OFF (S8: NO), the state of the tray plate detection sensor 15 is consistent with the state of the sheet size detection sensor 16 because it is known that the original sheet G to be conveyed along the S path 22A is a small sheet. In this case, the CPU 20 turns ON an S path flag, indicating that the original sheet G is to be conveyed along the S path 22A (S14). Then, the CPU 20 performs the reading process (S18).

On the other hand, if the sheet size detection sensor 16 is ON (S8: YES), the CPU 20 detects that the original sheet G to be conveyed along the S path 22A is a large sheet. If a large sheet is conveyed along the S path 22A, the sheet G cannot be discharged onto the sheet discharge tray 4B, and becomes jammed. Therefore, the CPU 20 controls the display unit 12 to display an error message saying, "Close the discharge tray plate because the discharge tray plate is opened," before starting to convey the original sheet G (S16). Then, the CPU 20 ends the conveyance reading process.

Figure 5:
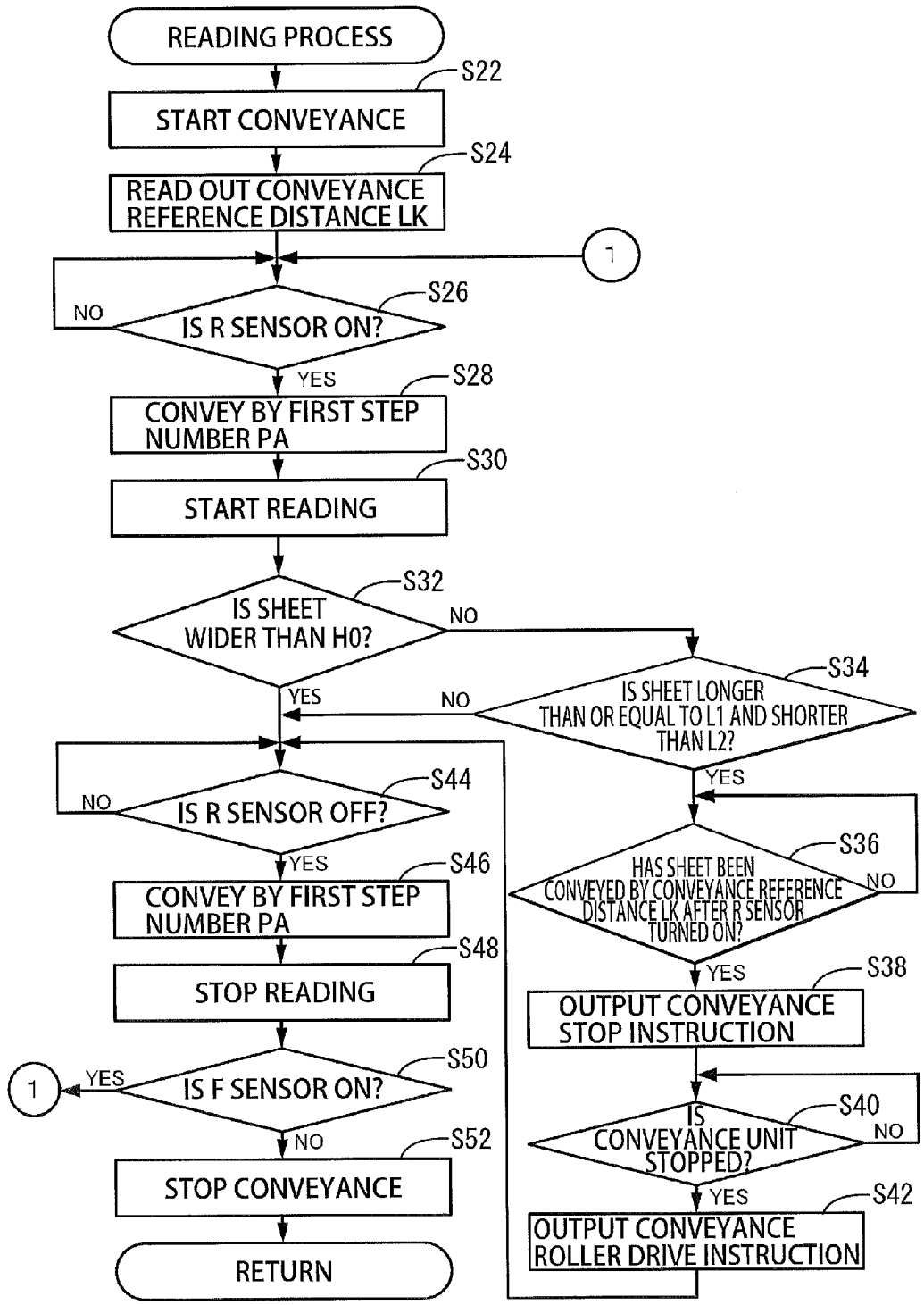
FIG. 5 is a flowchart of a reading process shown in FIG. 4 according to the first embodiment.

The following describes the reading process. FIG. 5 is a flowchart showing the reading process. In the reading process, the CPU 20 first instructs the conveyance unit 56 to convey an original sheet G (S22). At this time, the CPU 20 conveys the original sheet G at a constant conveyance speed that is determined based on the reading settings detected in S2. Then, the CPU 20 reads, from the ROM 26, a conveyance reference distance LK corresponding to a sheet size of the sheet type that has been detected in S2 (S24). The CPU 20 regards the sheet size of the sheet type set in S2 as the sheet size of the original sheet G to be read.

After starting conveying the original sheet G, the CPU 20 uses the rear sensor 14 to detect the position of the original sheet G being conveyed (S26: NO). When the rear sensor 14 is turned ON, indicating that a leading edge of the original sheet G has reached the detection position Y4 (S26: YES), the CPU 20 further moves the original sheet G by a first step number PA that is equivalent to a distance between the detection position Y4 and the first reading position Y1 along the conveyance path 22 (S28). Then, the CPU 20 instructs the first CIS 30 to read the original sheet G (S30).

Then, the CPU 20 compares the sheet width of the sheet type set in S2, that is, the sheet width of the original sheet G with the width H0 of the center region MH that is stored in the ROM 26 (S32). If the sheet width of the original sheet G is greater than the width H0 of the center region MH (S32: YES), the CPU 20 determines that the original sheet G is a large sheet such as an A4-size sheet. In this case, the CPU 20 continues conveying the original sheet G at the constant conveyance speed that is determined based on the reading settings, while reading the original sheet G.

On the other hand, if the sheet width of the original sheet G is less than or equal to the width H0 of the center region MH (S32: NO), the CPU 20 determines that the original sheet G is a small sheet such as a business card or postcard. If it is determined that the original sheet G is a small sheet, the CPU 20 further compares the sheet length of the sheet type set in S2, that is, the sheet length of the original sheet G with the first conveyance distance L1 and second conveyance distance L2 that are stored in the ROM 26 (S34).

If the sheet length of the original sheet G is greater than or equal to both of the first conveyance distance L1 and the second conveyance distance L2 (S34: NO), the CPU 20 determines that the original sheet G is of the second sheet type. In this case, as in the case where the CPU 20 determines that the original sheet G is a large sheet, the CPU 20 continues conveying the original sheet G at the constant conveyance speed that is determined based on the reading settings, while reading the original sheet G.

If the sheet length of the original sheet G is greater than or equal to the first conveyance distance L1 but less than the second conveyance distance L2 (S34: YES), the CPU 20 determines that the original sheet G is of the first sheet type. If it is determined that the original sheet G is of the first sheet type, the CPU 20 performs a process (S36 to S42) of outputting a conveyance stop instruction to the conveyance unit 56 in order to decrease the conveyance speed of the original sheet G at the separation timing.

More specifically, when the original sheet G has moved by the conveyance reference distance LK that is read in S24 after the rear sensor 14 turned ON (S36: YES), the CPU 20 outputs the conveyance stop instruction (S38). As described above, the conveyance reference distance LK is set to a distance that is determined by subtracting the third conveyance distance L3 from the sheet length of the original sheet G. Therefore, a timing at which the conveyance stop instruction is outputted substantially coincides with the separation timing at which the original sheet G separates from the sheet feed roller 40. More specifically, a position Z5 (See FIG. 2) where the original sheet G separates from the sheet feed roller 40 is slightly on the downstream side of the position Z1 where the sheet feed roller 40 is placed. Therefore, the timing at which the conveyance stop instruction is outputted is just ahead of the separation timing (See FIG. 7).

Figure 7:
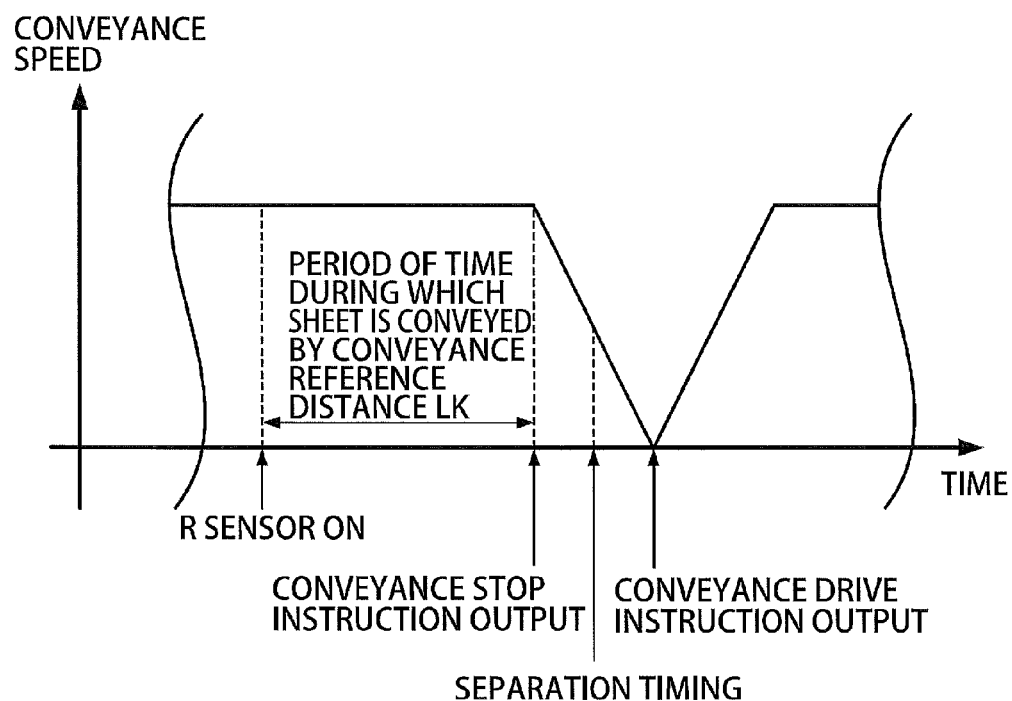
FIG. 7 shows how the original sheet conveyance speed changes in time.

As shown in FIG. 7, upon receipt of the conveyance stop instruction outputted from the CPU 20, the conveyance unit 56 decreases the conveyance speed of the original sheet G. As a result, the conveyance speed at the separation timing becomes slower than the constant conveyance speed that is determined based on the reading settings. The CPU 20 continues reading the original sheet G even while the conveyance speed is being decreased. In the ROM 26, a speed reduction table is stored. The speed reduction table shows sub-scanning magnifications which represent enlargement or reduction ratios that should be applied onto read data acquired by the CISs 30 and 32 in the sub-scanning direction D2 while the conveyance speed is decreased. In other words, the speed reduction table shows how the sub-scanning magnifications should be modified at a time when the conveyance speed is decreased. So, when the conveyance speed is decreased, the CPU 20 continues reading the original sheet G by using the speed reduction table.

The CPU 20 monitors, through the conveyance unit drive circuit 28, whether the conveyance unit 56 is stopped, that is, whether the conveyance speed of the original sheet G becomes zero (S40: NO). When the conveyance unit 56 is stopped (S40: YES), the CPU 20 outputs a conveyance drive instruction to start driving the conveyance unit 56 again (S42).

As shown in FIG. 7, after the conveyance drive instruction is outputted, the conveyance speed of the original sheet G rises until the conveyance speed reaches the constant conveyance speed that is determined based on the reading settings. The CPU 20 continues reading the original sheet G even while the conveyance speed is increased. In the ROM 26, a speed increase table is also stored. The speed increase table shows sub-scanning magnifications which represent enlargement or reduction ratios that should be applied onto read data acquired by the CISs 30 and 32 in the sub-scanning direction D2 while the conveyance speed is increased. In other words, the speed increase table shows how the sub-scanning magnifications should be modified at a time when the conveyance speed is increased. So, when the conveyance speed is increased, the CPU 20 continues reading the original sheet G by using the speed increase table.

The CPU 20 continues reading the original sheet G until the rear sensor 14 is turned OFF (S44: NO). When the rear sensor 14 is turned OFF, indicating that a conveyance-direction trailing edge of the original sheet G has reached the detection position Y4 (S44: YES), the CPU 20 further moves the original sheet G by the first step number PA by using the conveyance unit 56 (S46), and stops reading the surface of the original sheet G (S48).

Then, the CPU 20 uses the front sensor 13 to detect whether or not there is any original sheet G left on the sheet feed tray 2 to read (S50). If there is some original sheet G left to read (S50: YES), the CPU 20 repeats the process of S26 and subsequent processes. If there is no original sheet G left to read (S50: NO), the CPU 20 discharges the original sheet G onto a sheet discharge tray 4A or 4B corresponding to the sheet size thereof and stops conveying the original sheet G (S52), and ends the reading process and the conveyance reading process.

4. Operations of the Present Embodiment (1) The image reading apparatus 1 of the present embodiment determines whether the original sheet G is of the first or second sheet type. If the image reading apparatus 1 determines that the original sheet G is of the first sheet type, the conveyance speed of the original sheet G at the separation timing is made slower than that of another original sheet G that is determined to be of the second sheet type. The sheet length of the first sheet-type original sheet G is less than the second conveyance distance L2. So, at the separation timing, the first sheet-type original sheet G is not in contact with the second conveyance rollers 46. Therefore, compared with the second sheet-type original sheet G whose sheet length is greater than or equal to the second conveyance distance L2 and which is in contact with the second conveyance rollers at the separation timing, the conveyance speed of the first sheet-type original sheet G is more likely to rise at the separation timing.

So, in the image reading apparatus, the conveyance speed of the first sheet-type original sheet G is made slower at the separation timing than that of the second sheet-type original sheet G. Because the conveyance speed is made slower, even if the conveyance speed is increased instantaneously, a maximum speed that the conveyance speed can reach becomes slower than the case where the conveyance speed is not made slower. So, the distance the original sheet G is conveyed due to the instantaneous increase of the conveyance speed is restrained to a shorter length. Accordingly, when the CPU 20 controls the CISs 30 and 32 to scan the original sheet G at prescribed time intervals in the sub-scanning direction D2, occurrence of such a region that cannot be read because the original sheet G is conveyed a greater distance than planned, or such a region where image quality of read data becomes low can be restrained.

(2) In order to decrease the conveyance speed of the first sheet-type original sheet G at the separation timing, the image reading apparatus 1 of the present embodiment outputs the conveyance stop instruction. Therefore, the conveyance speed of the original sheet can be made slower in a limited period of time around the separation timing. The image reading apparatus 1 of the present embodiment outputs the conveyance stop instruction at almost the separation timing, or more specifically at a timing that is just ahead of the separation timing. Therefore, decrease in the image quality of read data due to decrease in the conveyance speed can be restrained during a period of time from when a process of reading the original sheet G is started until the separation timing.

(3) Before determining whether the original sheet G is of the first or second sheet type, the image reading apparatus 1 of the present embodiment determines whether the original sheet G is a small or large sheet. If the original sheet G is a small sheet, the image reading apparatus 1 then determines whether the original sheet G is of the first or second sheet type. The sheet width of the small sheet is less than the width H0 of the center region MH. So, at the separation timing, the small sheet is in contact with only one roller portion among the three roller portions constituting each of the first conveyance rollers 44. Therefore, the conveyance speed of a small sheet is more likely to rise at the separation timing, in comparison with a large sheet whose sheet width is greater than the width H0 of the center region MH and therefore which is in contact with all of the three roller portions constituting each of the first conveyance rollers 44 at the separation timing.

So, for a large sheet whose conveyance speed is relatively unlikely to rise, the image reading apparatus does not determine whether the sheet G is of a first or second sheet type. Only for a small sheet whose conveyance speed is relatively likely to rise, the image reading apparatus determines whether the sheet G is of the first or second sheet type. Therefore, only for an original sheet G whose conveyance speed is likely to rise due to its sheet size, rise in the conveyance speed is selectively suppressed. Therefore, it is possible to effectively restrain occurrence of: a region that cannot be read; or a region where the image quality of read data is low.

(4) Based on the reading settings that are detected prior to the reading process, the image reading apparatus 1 of the present embodiment detects the sheet size of an original sheet G to be read. Therefore, in the reading process, the image reading apparatus 1 determines, based on the detected sheet size, whether the original sheet G is a small or large sheet, and whether the original sheet G is of the first or second sheet type.

Second Embodiment

A second embodiment will be described with reference to FIGS. 4 and 8. The present embodiment is different from the first embodiment in that, in the reading process of the present embodiment, in order to decrease the conveyance speed of the first sheet-type original sheet G at the separation timing, the conveyance speed during the entire conveyance period of the sheet G, which includes the separation timing, is lowered compared with that of the second sheet-type original sheet G. In the following description, the same contents as those of the first embodiment will not be described again.

1. Conveyance Reading Process

As shown in FIG. 4, after starting the conveyance reading process, the CPU 20 receives the reading settings along with the conveyance reading instruction (S2). Also in the present embodiment, the reading settings are set so that the front surface of an original sheet G is to be read. The CPU 20 then performs the process of S4 and the subsequent processes, and executes the reading process of S18 if the judging result in S6 is affirmative or the judging result in S8 is negative.

Figure 8:
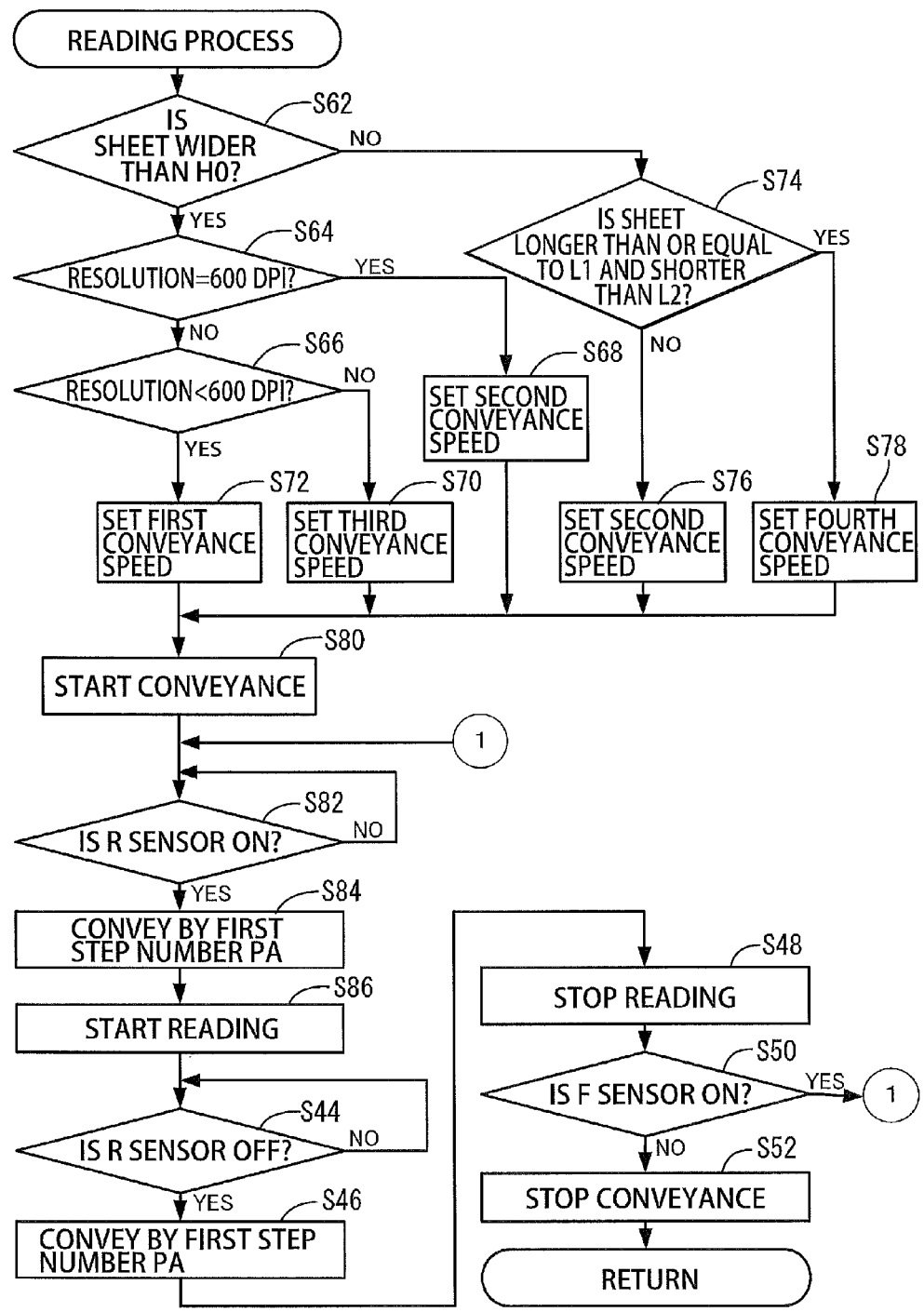
FIG. 8 is a flowchart of the reading process shown in FIG. 4 according to a second embodiment.

FIG. 8 is a flowchart showing the reading process of the present embodiment. In the reading process, the CPU 20 first compares the sheet width of the sheet type set in S2 with the width H0 of the center region MH that is stored in the ROM 26 (S62). If the sheet width of the original sheet G is greater than the width H0 of the center region MH (S62: YES), the CPU 20 determines that the original sheet G is a large sheet such as an A4-size sheet. In this case, the CPU 20 reads resolution from the reading settings detected in S2, and compares the read out resolution with a predetermined reference resolution (S64, S66). In this example, the reference resolution is equal to 600 dpi.

If the read out resolution is equal to the reference resolution (S64: YES), the CPU 20 sets a second conveyance speed as the conveyance speed of the original sheet G (S68). If the read resolution is greater than the reference resolution (S64: NO, S66: NO), the CPU 20 sets a third conveyance speed as the conveyance speed of the original sheet G (S70). The third conveyance speed is slower than the second conveyance speed. If the read resolution is less than the reference resolution (S64: NO, S66: YES), the CPU 20 sets a first conveyance speed as the conveyance speed of the original sheet G (S72). The first conveyance speed is faster than the second conveyance speed.

If the sheet width of the original sheet G is less than or equal to the width H0 of the center region MH (S62: NO), the CPU 20 determines that the original sheet G is a small sheet such as a business card or postcard. If it is determined that the original sheet G is a small sheet, the CPU 20 further compares the sheet length of the sheet type set in S2 with the first conveyance distance L1 and second conveyance distance L2 that are stored in the ROM 26 (S74).

If the sheet length of the original sheet G is greater than or equal to both of the first conveyance distance L1 and the second conveyance distance L2 (S74: NO), the CPU 20 determines that the original sheet G is of the second sheet type. In this case, the CPU 20 sets the second conveyance speed as the conveyance speed of the original sheet G (S76).

If the sheet length of the original sheet G is greater than or equal to the first conveyance distance L1 but less than the second conveyance distance L2 (S74: YES), the CPU 20 determines that the original sheet G is of the first sheet type. If it is determined that the original sheet G is of the first sheet type, the CPU 20 sets a fourth conveyance speed as the conveyance speed of the original sheet G (S78). The fourth conveyance speed is slower than the second conveyance speed. Incidentally, as long as the fourth conveyance speed is slower than the second conveyance speed, the fourth conveyance speed may be faster, or slower, than the third conveyance speed.

After setting the conveyance speed of the original sheet G, the CPU 20 gives an instruction to convey the original sheet G at the set conveyance speed (S80). After giving the instruction to convey the original sheet G, the CPU 20 uses the rear sensor 14 to detect the position of the original sheet G being conveyed (S82: NO). When the rear sensor 14 is turned ON, indicating that a leading edge of the original sheet G has reached the detection position Y4 (S82: YES), the CPU 20 uses the conveyance unit 56 to further move the original sheet G by the first step number PA (S84). The CPU 20 then instructs the first CIS 30 to read the original sheet G (S86). Incidentally, after the process of reading the original sheet G is started, the same processes as those of the first embodiment are carried out, and therefore will not be described again.

2. Operation of the Present Embodiment

In order to decrease the conveyance speed of the first sheet-type original sheet G at the separation timing, the image reading apparatus 1 of the present embodiment sets conveyance speeds for the first sheet-type original sheet G and the second sheet-type original sheet G individually such that the conveyance speed of the first sheet-type original sheet G is slower than the conveyance speed of the second sheet-type original sheet G. Therefore, over the entire conveyance period of time including the separation timing, the conveyance speed of the first sheet-type original sheet G is kept slower than the conveyance speed of the second sheet-type original sheet G. Moreover, occurrence of changes in the conveyance speed of the original sheet G can be restrained during the conveyance period.

Third Embodiment

A third embodiment will be described with reference to FIG. 9. The present embodiment is different from the first embodiment in the following points: That is, in the reading process according to the first embodiment, the sheet size of the original sheet G is detected from the reading settings. Contrarily, in the reading process according to the present embodiment, the sheet size of the original sheet G is detected from leading-edge read data of the original sheet G that is acquired by reading a leading edge of the original sheet G. In the following description, the same contents as those of the first embodiment will not be described again.

Also according to the present embodiment, the reading settings are set so that the front surface of an original sheet G is to be read. Moreover, according to the present embodiment, original sheets G to be read by the image reading apparatus 1 are so-called standard-size sheets G such as business cards, postcards, and A4-size sheets, for which sheet lengths can be estimated based on sheet widths.

1. Conveyance Reading Process

Figure 9:
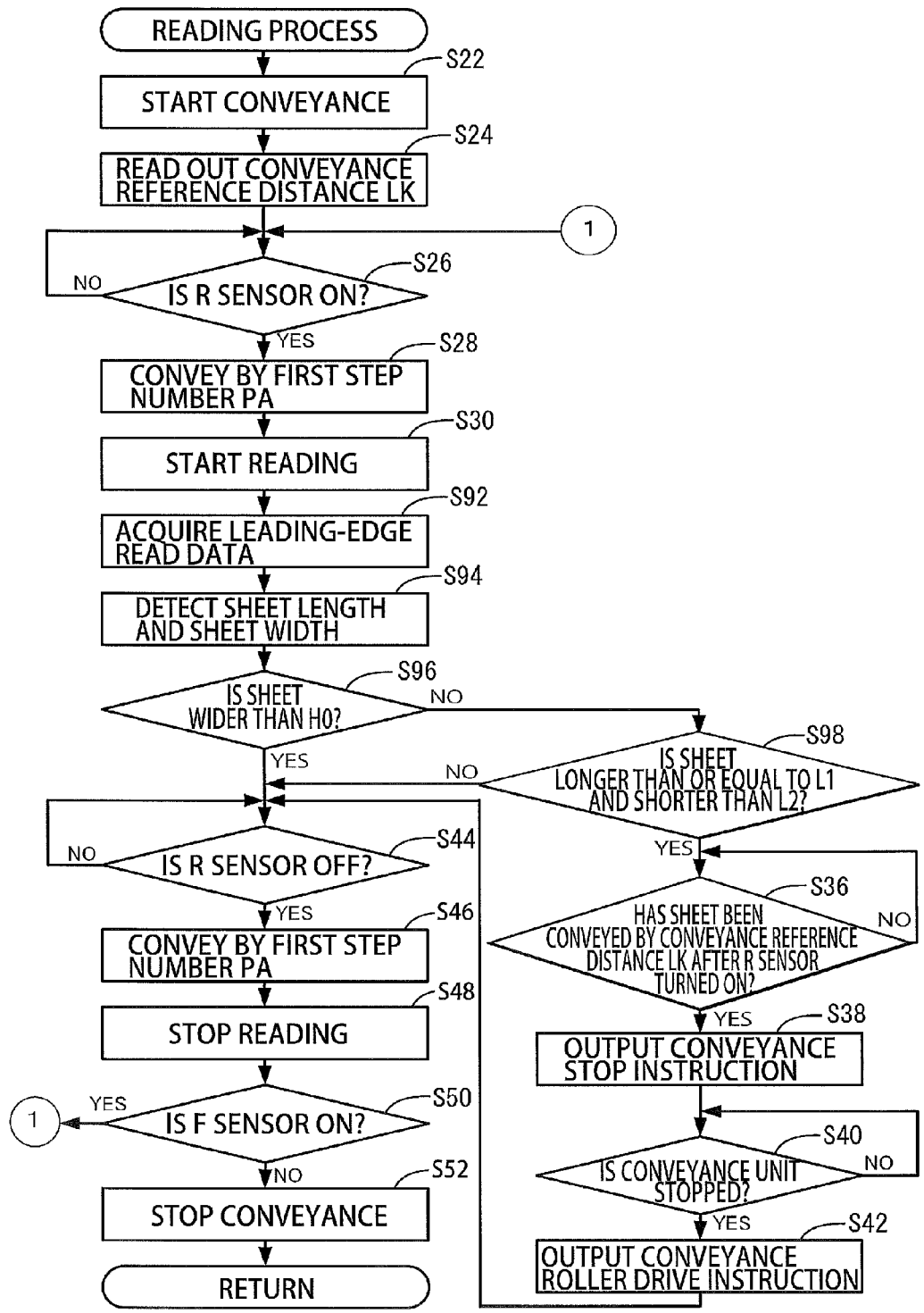
FIG. 9 is a flowchart of the reading process shown in FIG. 4 according to a third embodiment.

FIG. 9 is a flowchart showing the reading process of the present embodiment. In the reading process, after instructing the first CIS 30 to read the original sheet G (S30), the CPU 20 controls the first CIS 30 to read a predetermined reading range of the original sheet G that is positioned at a leading-edge of the original sheet G and to acquire the leading-edge read data (S92). The CPU 20 detects the sheet width of the original sheet G based on the acquired leading-edge read data, and estimates the sheet length of the original sheet G based on the sheet width (S94).

The CPU 20 compares the sheet width of the original sheet G that is detected in S94 with the width H0 of the center region MH that is stored in the ROM 26, and determines whether the original sheet G is a large or small sheet (S96). If it is determined that the original sheet G is a small sheet (S96: NO), the CPU 20 then compares the sheet length of the original sheet G that is estimated in S94 with the first conveyance distance L1 and second conveyance distance L2 that are stored in the ROM 26, and determines whether the original sheet G is of the first or second sheet type (S98). Incidentally, the subsequent processes are the same as those of the first embodiment, and therefore will not be described again.

2. Operations of the Present Embodiment

The image reading apparatus 1 of the present embodiment detects the sheet width of the original sheet G to be read based on the leading-edge read data that is acquired by reading the conveyance-direction leading edge of the original sheet G, thereby detecting the sheet size. Since the sheet size is detected from the leading-edge read data that is acquired from the original sheet G to be read, an accurate determination can be made as to whether the original sheet G is a small or large sheet, or whether the original sheet G is of the first or second sheet type.

Other Embodiments

While the invention has been described in detail with reference to the embodiments thereof, it would be apparent to those skilled in the art that various changes and modifications may be made therein without departing from the spirit of the invention.

(1) For example, according to the above-described embodiments, the image reading apparatus 1 has a scanner function. However, the present invention is not limited to this example. For example, the present invention may be applied to a multifunction peripheral having a printer function, copy function, facsimile function, and other functions.

(2) According to the above embodiments, the image reading apparatus 1 has a single CPU 20 that executes various processes in the conveyance reading process. However, the present invention is not limited to this example. For example, a plurality of CPUs may be employed each for executing each part in the conveyance reading process. Or, one or more hardware circuit such as ASIC (Application Specific Integrated Circuit) may be employed for executing each part in the conveyance reading process. Or, one or more CPU and one or more ASIC may be employed to execute each part in the conveyance reading process.

(3) The program executed by the CPU 20 is not necessarily stored in the ROM 26. The program may be stored in the CPU 20 or any other storage device.

(4) According to the above embodiments, based on the positional relationship between the conveyance rollers 44 and 46 of the image reading apparatus 1, an A4-size sheet serves as an example of the large sheet, a business card and a postcard serve as examples of the small sheet, and a business card serves as an example of the first sheet-type original sheet G, and a postcard serves as an example of the second sheet-type original sheet G. However, the present invention is not limited to this example. For example, if the positional relationship between the conveyance rollers 44 and 46 is changed, a postcard may belong to the first sheet-type original sheets G, and an A4-size sheet may belong to the small sheet.

(5) According to the above embodiments, in determining whether the original sheet G is a small or large sheet, the size of the original sheet is detected from the reading settings or the leading-edge read data. However, the present invention is not limited to this example. For example, based on the state of the sheet size detection sensor 16, a determination may be made as to whether the original sheet G is a small or large sheet. If the state of the sheet size detection sensor 16 is consistent with the state of the tray plate detection sensor 15, a determination may be made as to whether the original sheet G is a small or large sheet based on the state of the tray plate detection sensor 15, instead of the state of the sheet size detection sensor 16.

(6) According to the above embodiments, first a determination is made as to whether the original sheet G is a small or large sheet; and, if it is determined that the original sheet G is a small sheet, then a determination is made as to whether the original sheet G is of the first or second sheet type. However, the present invention is not limited to this example. For example, the determination as to whether the original sheet G is a small or large sheet may not be executed, and the determination as to whether the original sheet G is of the first or second sheet type may be applied onto all the original sheets to be read.

(7) According to the above embodiments, in order to decrease the conveyance speed of the first sheet-type original sheet G at the separation timing, the conveyance stop instruction is outputted. However, the present invention is not limited to this example. For example, instead of the conveyance stop instruction, a speed reduction instruction may be outputted to decrease the conveyance speed of the first sheet-type original sheet G at the separation timing. It is noted that the conveyance stop instruction in the first embodiment serves to decrease the conveyance speed before finally stopping the conveyance. So, it can be said that the conveyance stop instruction in the first embodiment serves also as an example of the speed reduction instruction.

What is claimed is:
1. An image reading apparatus, comprising:
a sheet feed tray;
a supply roller configured to rotate while being in contact with an original sheet placed on the sheet feed tray and to send out the original sheet one sheet by one sheet to a conveyance path;
a conveyance unit including a first conveyance roller and a second conveyance roller and configured to convey, along the conveyance path, the original sheet that has been sent out by the supply roller to the conveyance path, the conveyance unit conveying the original sheet by using the first conveyance roller and the second conveyance roller in succession in this order;

a discharged-sheet receiving unit, into which the original sheet that has been conveyed by the conveyance unit is discharged;

an image reading unit disposed at a reading position along the conveyance path between the first conveyance roller and the second conveyance roller and configured to read an image, in a main scanning direction, from the original sheet conveyed by the conveyance unit at the reading position; and a control device configured to:
  judge whether the original sheet is either one of a first sheet type, whose sheet length in a conveying direction along the conveyance path is longer than or equal to a first conveyance distance and shorter than a second conveyance distance, and a second sheet type, whose sheet length in the conveying direction along the conveyance path is longer than or equal to the second conveyance distance, the first conveyance distance being a distance between the first conveyance roller and the second conveyance roller along the conveyance path, the second conveyance distance being a distance between the supply roller and the second conveyance roller along the conveyance path;
  control the conveyance unit to convey the original sheet such that if the original sheet is of the first sheet type, the original sheet starts being conveyed at a prescribed conveyance speed,
  the conveyance speed is changed to a value smaller than the prescribed conveyance speed at a timing before a separation timing when the original sheet separates away from the supply roller, and
  the conveyance speed is returned to the prescribed conveyance speed at a timing after the separation timing; and
  read, by using the image reading unit, an image from the original sheet that is conveyed by the conveyance unit through the control.

2. The image reading apparatus as claimed in claim 1, wherein if the original sheet is of the first sheet type, the control device outputs to the conveyance unit a conveyance stop instruction to stop conveyance at a timing immediately before the separation timing, and outputs to the conveyance unit a conveyance restart instruction to restart conveyance at a timing when the conveyance speed reaches zero.

3. The image reading apparatus as claimed in claim 1, wherein
  the supply roller is disposed in part of a conveyance region of the conveyance path in the main scanning direction,
  the first conveyance roller includes a plurality of roller portions arranged in the entire conveyance region in the main scanning direction,
  the control device is further configured to judge whether the original sheet is of a narrow sheet type or a wide sheet type, the number of a roller portion that constitutes the first conveyance roller and that conveys an original sheet of the narrow sheet type being smaller than or equal to a reference number, the number of a roller portion that constitutes the first conveyance roller and that conveys an original sheet of the wide sheet type being greater than the reference number,
  the control device is configured to judge whether the original sheet is of the first sheet type or the second sheet type if the original sheet is determined to be of the narrow sheet type.

4. The image reading apparatus as claimed in claim 1, wherein
  the discharged-sheet receiving unit includes a first sheet discharge tray and a second sheet discharge tray,
  the conveying path diverges into a first conveyance path and a second conveyance path at a position downstream of the second conveyance roller in the conveying direction,
  the conveyance unit conveys an original sheet of the narrow sheet type using the first conveyance path to the first sheet discharge tray, and conveys an original sheet of the wide sheet type using the second conveyance path to the second sheet discharge tray.

5. The image reading apparatus as claimed in claim 1, further comprising an operation unit configured to allow a user to input data indicative of a sheet size of the original sheet, and
  wherein the control device is configured to detect a sheet length of the original sheet based on the inputted data indicative of the sheet size, thereby determining the sheet type of the original sheet.

6. The image reading apparatus as claimed in claim 1, wherein
  the original sheet has either one of a plurality of different standard sizes whose sheet lengths are longer than a third conveyance distance, the third conveyance distance being a distance between the supply roller and the reading position along the conveyance path, and
  the control device is configured to detect the sheet length of the original sheet based on leading-edge read data acquired by the reading unit reading a leading edge of the original sheet in the conveying direction, thereby determining the sheet type.

7. The image reading apparatus as claimed in claim 1, wherein the control device controls the conveyance unit to convey the original sheet at the prescribed conveyance speed if the original sheet is of the second sheet type.

* * * * *